United States Patent [19]

Sato

[11] Patent Number: 5,737,620
[45] Date of Patent: Apr. 7, 1998

[54] IMAGE PROCESSING METHOD AND APPARATUS HAVING AN INTERPRETER FUNCTION FOR CONVERTING INFORMATION DESCRIBED IN A PAGE DESCRIPTION LANGUAGE INTO IMAGE DATA

[75] Inventor: Yuichi Sato, Yokohama, Japan

[73] Assignee: Canon Kabushiki Kaisha, Tokyo, Japan

[21] Appl. No.: 465,190

[22] Filed: Jun. 5, 1995

Related U.S. Application Data

[63] Continuation of Ser. No. 797,926, Nov. 26, 1991, abandoned.

[30] Foreign Application Priority Data

Nov. 29, 1990 [JP] Japan ................................ 2-325897

[51] Int. Cl.$^6$ ........................................................ G06F 11/10
[52] U.S. Cl. ............................................................ 395/791
[58] Field of Search .................................. 395/131, 145, 395/147, 161, 155; 358/450, 452

[56] References Cited

U.S. PATENT DOCUMENTS

| | | | |
|---|---|---|---|
| 4,947,260 | 8/1990 | Reed et al. .......................... | 358/450 X |
| 4,949,279 | 8/1990 | Takakura et al. .................... | 395/131 X |
| 4,954,912 | 9/1990 | MacDonald et al. ................ | 358/452 X |
| 5,018,085 | 5/1991 | Smith, Jr. ............................. | 395/131 X |
| 5,025,396 | 6/1991 | Parks et al. .......................... | 395/147 |
| 5,045,967 | 9/1991 | Igarashi ............................... | 395/131 |
| 5,058,185 | 10/1991 | Morris et al. ....................... | 395/155 X |
| 5,062,058 | 10/1991 | Morikawa ............................ | 395/131 |
| 5,191,406 | 3/1993 | Brandestini et al. ................ | 395/131 X |

*Primary Examiner*—Phu K. Nguyen
*Assistant Examiner*—Cliff N. Vo
*Attorney, Agent, or Firm*—Fitzpatrick, Cella, Harper & Scinto

[57] ABSTRACT

An image processing method and apparatus for producing and outputting combined image data by combining first image data, which is produced by interpreting image information described in page-description language (PDL), and second image data, which is produced separately from the first image data. The first image data produced by interpreting the PDL received from a host computer is stored in first through fourth image memories for each of the color components (Y, M, C and BK). In synchronization with this storage of data, position information of a pixel which outputs the first image data located on the combined image is delivered to the RAM of a bit-map memory. The bit-map memory has a size corresponding to the size of the combined image. If, with regard to each pixel of the combined image, even one color component among the color components of the first image data is output, a "1" is set for this pixel in the bit-map memory. Next, the first image data and the second image data are combined based upon the position information developed in the bit-map memory. If, with regard to each pixel of the combined image, the position information is "1" at the time of combination, the first image data is selected. If the position information is "0", the second image data is selected.

18 Claims, 9 Drawing Sheets

IMAGE PROCESSING METHOD AND APPARATUS HAVING AN INTERPRETER FUNCTION FOR CONVERTING INFORMATION DESCRIBED IN A PAGE DESCRIPTION LANGUAGE INTO IMAGE DATA

This application is a continuation of application Ser. No. 07/797,926 filed Nov. 26, 1991, now abandoned.

BACKGROUND OF THE INVENTION

1. Field of the Invention

This invention relates to an image processing method and an apparatus therefore. More particularly, the invention relates to an image processing method and apparatus having an interpreter function for converting, into image data, information described in a page-description language (hereinafter referred to as a "PDL") such as POST-SCRIPT®.

2. Description of the Prior Art

A method heretofore available for combining image information written in a page-description language such as POSTSCRIPT® with a multivalue natural image involves temporarily recording the natural image in a memory device beforehand by a host computer (hereinafter referred to as the "host") and then combining the natural image recorded temporarily in the memory device with the image information, which has been written in the page-description language, in a buffer memory while reading out the natural image when the aforementioned image information is developed at a desired position of a page memory.

Another method available in the art includes recording the natural image at a desired position of a page memory beforehand by a host and then writing the image information, which has been written in the page-description language, over the natural image when the image information is developed in the page memory.

In the methods described above, it is necessary for the host to handle the multivalue natural image directly, and therefore the load on the host CPU is increased. Therefore, in order to avoid this disadvantage, a color printer has been proposed in which the printer outputs a color image upon receiving color PDL data. For example, as disclosed in Japanese Patent Application No. 2-159950 filed on Jun. 20, 1990, there is an image forming apparatus available in which an image is formed by combining a binary value image and a multivalue image. According to the invention disclosed in the aforesaid application, the apparatus determines the absence or presence of individual output color components from a first image having a plurality of output color components, combines output color components giving priority to the first or second image depending upon the results of the determination, and forms an image based upon each output color component resulting from the combination.

However, since the host is required to handle the multivalue natural image data directly in the example of the prior art described above, the CPU of the image forming apparatus participates directly in accessing a bit-map memory for storing whether or not there is an image. As a consequence, the aforementioned prior art has the following drawbacks:

(1) The load on the host is increased.

(2) In a case where the output color components are read out simultaneously without using a bit-map memory, the OR (logical sum) of each output color component is taken pixel by pixel and the data which is the result of taking the OR is output in synchronization with the output of each output color component, the construction of the logical circuitry is very complicated resulting in an increase in size of the hardware configuration.

(3) The load on the CPU of the image forming apparatus is increased.

SUMMARY OF THE INVENTION

Accordingly, an object of the present invention is to provide an image processing method whereby image information described in PDL and other image information can be combined very efficiently.

According to the present invention, the foregoing object is attained by providing an image processing method for producing a combined image by combining first image data produced based upon image information described in page-description language and second image data produced by a method different from that used in producing the first image data, comprising: an input step of inputting the page-description language; an interpretation step of interpreting the image information described in the page-description language and producing the first image data; a position-information producing step of producing position information, which is indicative of a position at which the first image data is output, on the combined image; and a combining step of producing a combined image by combining the first image data and the second image data based upon the position information.

Another object of the present invention is to provide an image processing apparatus whereby image information described in PDL and other image information can be combined very efficiently.

According to the present invention, the foregoing object is attained by providing an image processing apparatus for producing a combined image by combining first image data produced based upon image information described in page-description language and second image data produced by a method different from that used in producing the first image data, comprising: receiving means for receiving the page-description language; interpretation means for interpreting the image information described in the page-description language and producing the first image data; first memory means for storing the first image data; position-information producing means for producing position information, which is indicative of a position at which the first image data is output, on the combined image; second memory means for storing the position information; and combining means for producing a combined image by combining the first image data and the second image data based upon the position information.

In accordance with the present invention as described above, the position information indicative of the position at which the first image data is output is produced on the combined image in synchronization with the production of the first image data from the received PDL, and a combined image is produced by combining the first and second image data based upon the position information.

The invention is particularly advantageous since the load on the CPUs of the host and image processing apparatus is suppressed, and image information described in PDL can be combined with other image information very efficiently.

Also, another object of the present invention is to provide an image processing apparatus capable of performing various kinds of editing processing.

Another object of the present invention is to provide a multi-functional copier.

Another object of the present invention is to provide an image processing apparatus suitable for high-speed processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

<First Embodiment>

[General description of the construction of the apparatus (FIG. 1)]

Figure 1:
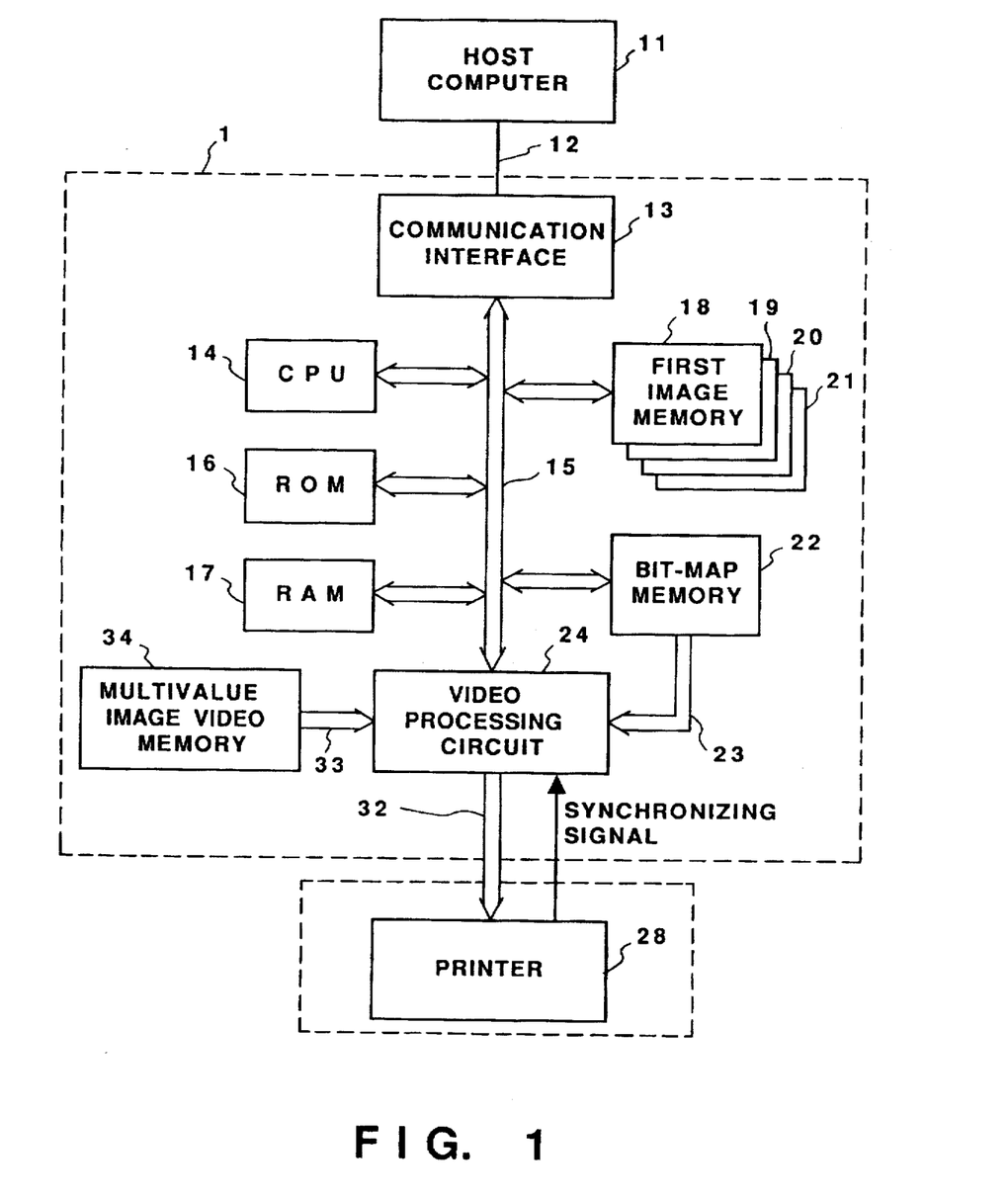
FIG. 1 is a block diagram illustrating the construction of an image processing apparatus in accordance with a first embodiment of the invention.

FIG. 1 is a block diagram illustrating the construction of an image processing apparatus in accordance with a first embodiment of the present invention. The image processing apparatus in this embodiment comprises an interpreter 1 for receiving and interpreting image information, which is described in PDL, from a host computer 11, and combining this image information with multivalue image data that has been stored in an internally provided multivalue-image video memory, and a printer 28 for receiving an printing out a video signal output by the interpreter 1. The host computer (hereinafter referred to as the "host") 11 outputs image information described in PDL. Numeral 12 denotes a signal line for transmitting the image information described in PDL.

The interpreter 1 comprises an interface 13 for communicating with the host 11; a CPU 14 for interpreting the image information, which is described in PDL, received by the communication interface 13, developing the image information into a raster image, and performing communication control; a CPU bus 15 which connects each of the components of the apparatus; a ROM 16 for storing font data as well as programs for interpreting the image information written in PDL, developing the information into the raster image, and performing sequence control and communication control; a RAM 17 which temporarily stores the programs run by the CPU 14 and is used as a temporary working area; a first image memory 18 for developing page data of a first color (yellow: hereinafter referred to as a "Y"); a second image memory 19 for developing page data of a second color (magenta: hereinafter referred to as a "M"); a third image memory 20 for developing page data of a third color (cyan: hereinafter referred to as a "C"); a fourth image memory 21 for developing page data of a fourth color (black: hereinafter referred to as a "Bk"); a bit-map memory 22 which stores synthesis control information for image synthesizing processing; a video processing circuit 24; and a multivalue-image video memory 34.

In the multivalue image video memory 34, multivalue image data from many kinds of channels such as an image scanner employing CCD sensors, a still video camera, a video camera, a host computer and so on is stored in the form of four colors (Y, M, C, Bk) multivalue image data.

Synthesis control information data for image synthesizing processing is output on a data line 23 from the bit-map memory 22, multivalue image data is output on a data line 33 from the multivalue-image video memory 34, and a video signal is output on a data line 32 from the video processing circuit 24.

On the basis of the synthesis control information data (hereinafter referred to simply as "control information") transmitted via the data line 23 for the purpose of image synthesizing processing, the video processing circuit 24 frame-sequentially produces synthesized image data by combining image data transmitted under the control of the CPU 14 and multivalue image data transmitted from the multivalue-image video memory 34 in the order of colors yellow, magenta, cyan, and black, and frame-sequentially outputs the synthesized image data to the printer 28 based upon a synchronizing signal from the printer 28 in the order of colors yellow, magenta, cyan, and black.

[Description of the construction of the bit-map memory (FIGS. 2, 3)]

Figure 2:
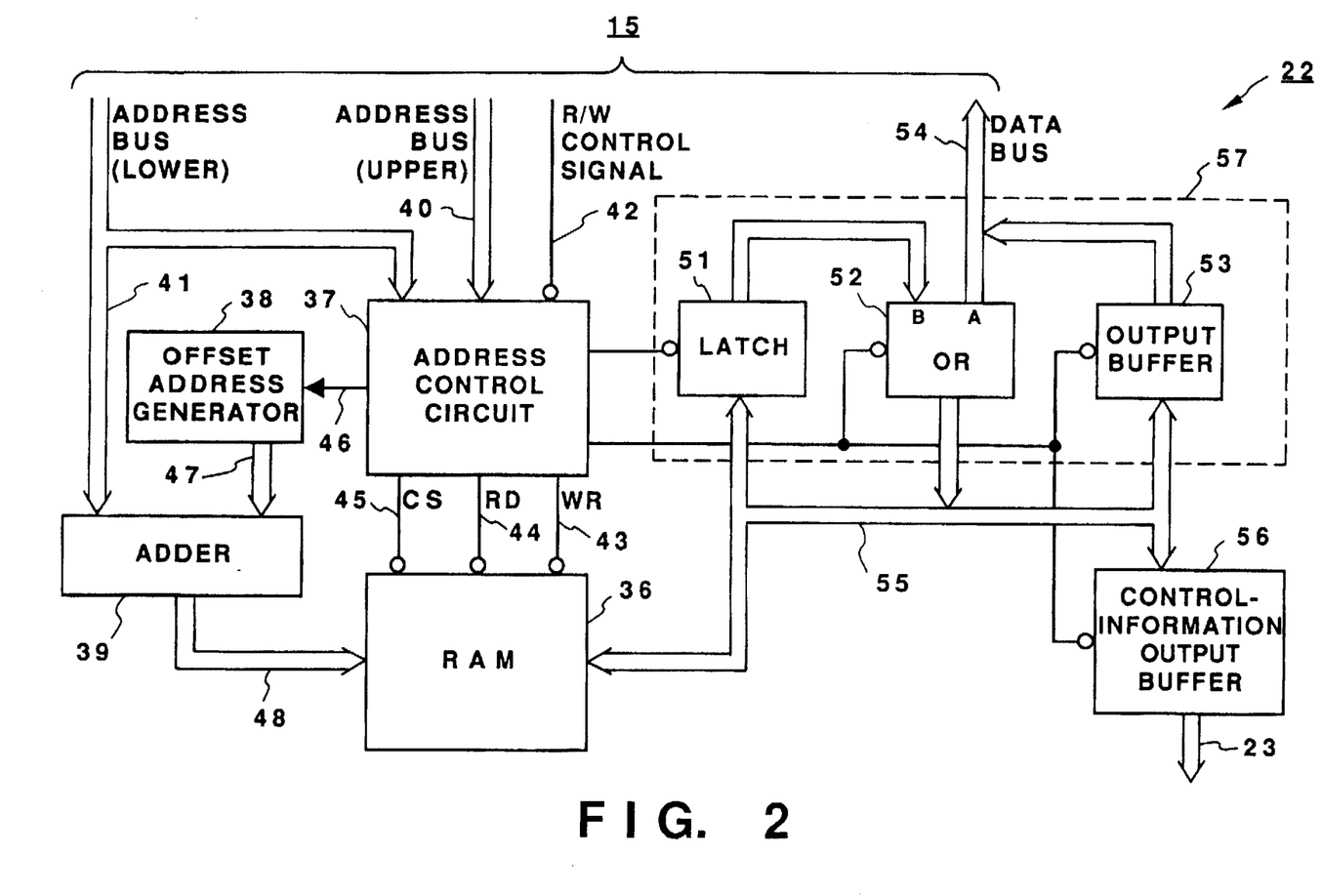
FIG. 2 is a block diagram illustrating the detailed construction of a bit-map memory.

FIG. 2 is a block diagram illustrating the detailed construction of the bit-map memory 22. In FIG. 2, numeral 36 denotes a RAM for storing the control information, 37 an address control circuit, 38 an offset address generator, 39 an adder, 40 an upper address bus, 41 a lower address bus, 42 a R/W control signal line, 43 a write signal line, 44 a read signal line, 45 a chip-select signal line, 46 an offset-select signal line, 47 an offset address line, 48 a RAM address signal line, 49 an output-buffer control signal line, and 50 a latch control signal line. Further, numeral 51 represents a latch, 52 an OR circuit, 53 an output buffer, 54 a CPU data bus, 55 a RAM data bus, and 56 a control-information output buffer.

The bit-map memory 22 has an internal RAM 36 which stores the control information for image synthesizing processing. Writing/reading of the RAM 36 is performed via the address control circuit 37 and a data converting circuit 57. The address bus (upper) 40, address bus (lower) 41 and data bus 54 contained in the CPU bus 15 of CPU 14 (FIG. 1) are connected to write/read control lines (for the write signal 43, read signal 44 and chip-select signal 45) of RAM 36, the RAM address signal bus 48 and the RAM data bus 55 via the address control circuit 37, adder 39 and data converting circuit 57, respectively.

Figure 3:
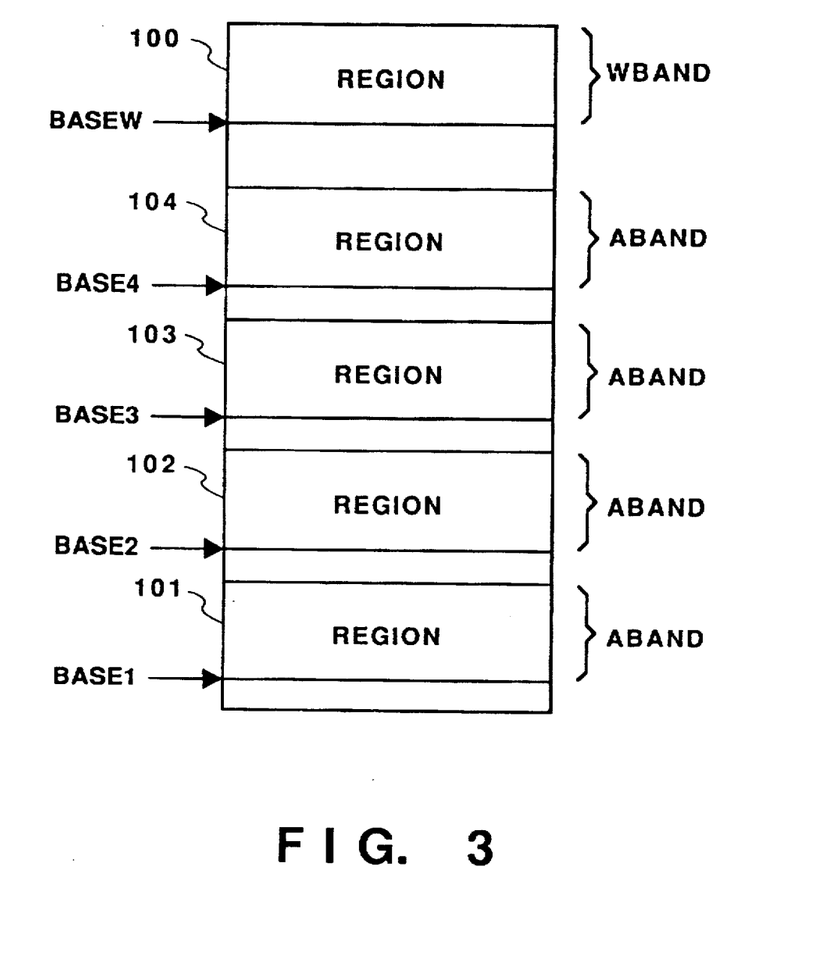
FIG. 3 is a diagram showing the address map of first through fourth memories and of the bit-map memory.

FIG. 3 is a diagram showing an address map of the logical addressing space of the first through fourth memories 18–21 and bit-map memory 22. These five memories (respectively constituted by RAMs) are addressed logically by one addressing space. As illustrated in FIG. 3, the addressing space (hereinafter referred to as a "region 100") of the bit-map memory 22 is assigned to a range having a fixed address width "WBAND" from a logical address "BASEW", and direct access from the CPU 14 can be achieved as in the manner of an ordinary RAM. Physically, the logical space of region 100 corresponds to the RAM 36.

When data is written in the initial region 100 after an initial resetting operation, control is performed in such a manner that output data of the latch 51 is set at "0" by the latch control signal 50 and the data on the CPU data bus 54 is applied to the RAM data bus 55 as is. The writing of data to the region 100 (namely RAM 36) from the second time onward is controlled in such a manner that data already written in the RAM 36 is read out and applied to the OR circuit 52 via the latch 51, an OR operation is performed, bit-by-bit in the OR circuit 52, between this data and data which enters through the CPU data bus 54, and the result of the OR operation is fed back to the RAM 36 to be written in again at an address the same as that which prevailed at the time of read-out. The OR circuit 52 is equipped with an output buffer (not shown), and the output thereof is controlled by the output-buffer control signal 49 produced by the address control circuit 37.

Data thus written in is output to the control-information output buffer 56 via the RAM data bus 55, and this data is controlled by the output-buffer control signal 49 and output from the buffer 56 though the data line 23. It is possible also to read out the data to the CPU data bus 54 via the output buffer 53.

Four memory spaces each having a fixed address width (ABAND) from BASE1, BASE2, BASE3, BASE4 generated in accordance with four offset addresses that have been preset are assigned to regions 101–104 of the logical addresses shown in FIG. 3, respectively. The regions 101–104 correspond to the physical addresses of the first through fourth image memories 18–21, respectively.

The address control circuit 37 outputs the offset-select signal 46 to the offset address generator 38 in accordance with the CPU address bus (upper) 40, CPU address bus (lower) 41, the R/W signal 42 on the CPU bus, and the above-mentioned memory map information that has been preset. In addition, the address control circuit 37 outputs the write/read control signals [write signal (WR) 43, read signal (RD) 44 and chip-select signal (CS) 45].

When the address control circuit 37 selects an access channel to either the first through fourth image memories 18–21 or the bit-map memory 22, based on the value of the CPU address buses 40 and 41, the address control circuit 37 generates a physical address with respect to the pixels on the RAM 36 in cooperation with the offset address generator 38 and the adder 39. At this time, more specifically, the address control circuit 37 selects an offset address to be added on the CPU address bus (lower) 41, depending on the memory space of which is either the first, the second, the third or the fourth image memory. The adder 39 generates the physical address on the RAM 36 by adding the offset address value from the offset address generator 38 to the value from the CPU address bus (lower) 41.

For example, assuming that hexadecimal representation of logical addresses, physical addresses and offset addresses with respect to BASE4, BASE3, BASE2, BASE1 and BASEW are as follows;

|       | logical address | physical address | offset address |
|-------|----------------|------------------|----------------|
| BASE4 | 7A0000         | 000000           | 860000         |
| BASE3 | 5C0000         | 000000           | A40000         |
| BASE2 | 3E0000         | 000000           | C20000         |
| BASE1 | 200000         | 000000           | E00000         |
| BASEW | A00000         | 000000           | 600000         | if the value of the CPU address bus (upper) 40 is "2", the value of the CPU address bus (lower) 41 is "23AB8", and the first image memory 18 is selected, then the offset address is "E00000" and the physical address is "23AB8".

The offset address generator 38 outputs the offset address 47 to the adder 39 based upon the offset-select signal 46, the address of the address bus (lower) 41 is converted by the adder 39, and the converted address is applied to the RAM 36 as the RAM address signal 48.

As described above, when each of four color components (Y, M, C, Bk) image data interpreted by the CPU 14 is respectively written into the first through fourth image memories 18–21, the control information is also concurrently written into the RAM 36. More specifically, the same image data as that written into the first image memory 18 is first written into the RAM 36. Next, the OR circuit 52 performs the logical OR operation of both the same image data as that written into the second image memory 19 and the image data previously stored in the RAM 36. After this, the result of the OR operation is again stored back through the RAM data bus 55 at the corresponding address of the RAM 36.

Likewise, the same processing is executed with respect to the image data to be stored into the third and fourth image memories 20, 21 so as to generate control information.

According to this embodiment, as described above, when each of four color components (Y, M, C, and Bk) is respectively written into the first through fourth image memories 18–21, the control information is concurrently written into the RAM 36. This results in high speed processing and reduction of CPU load.

[Description of the construction of the video processing circuit (FIG. 4)]

Figure 4:
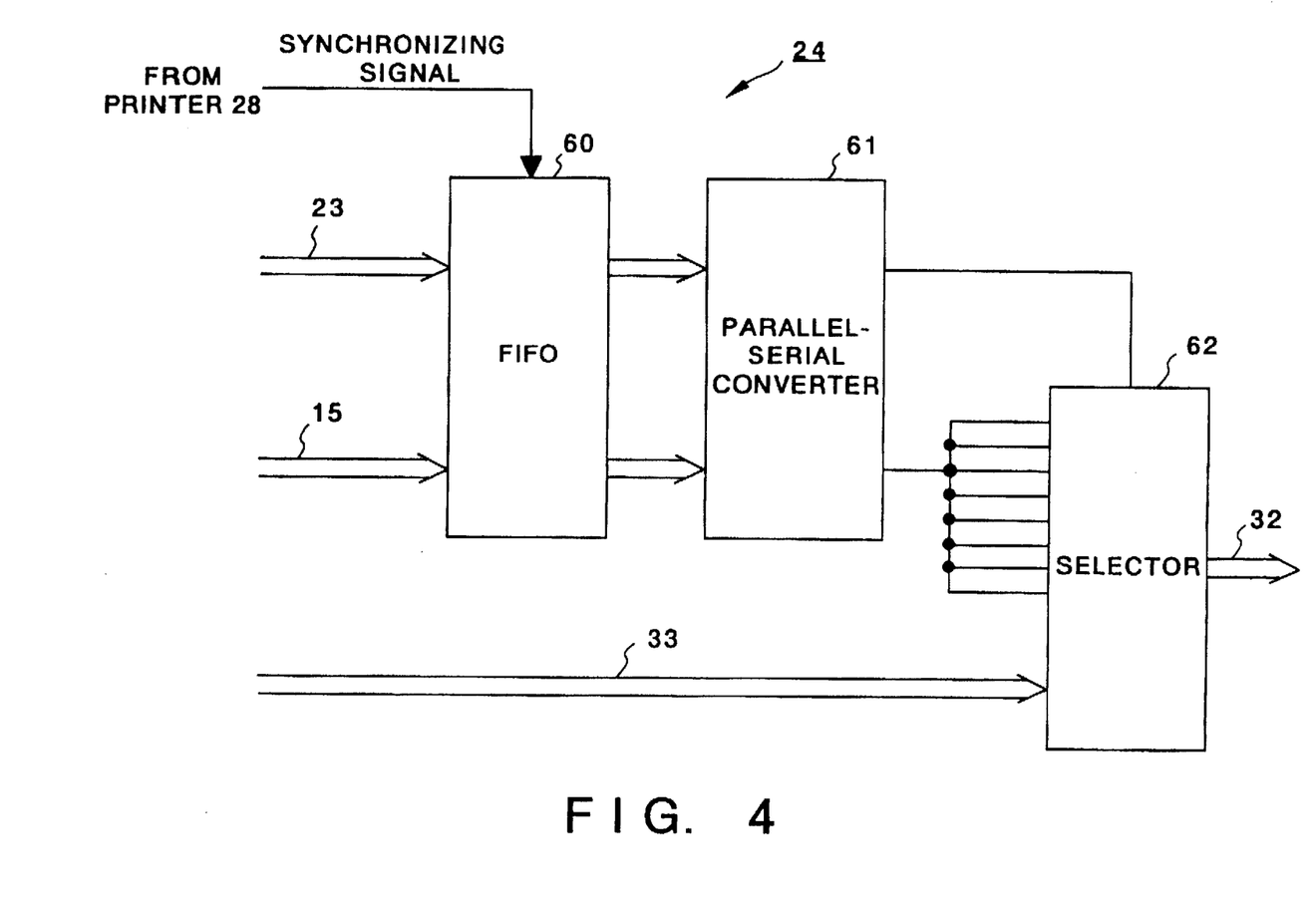
FIG. 4 is a block diagram showing the detailed construction of a video processing circuit in this embodiment.

FIG. 4 is a block diagram illustrating the detailed construction of the video processing circuit 24. Numeral 60 denotes a FIFO memory, to which the data on the CPU bus 15 and the control information output through the data line 23 are input simultaneously, for outputting this input data in synchronization with the synchronizing signal from the printer 28. Numeral 61 designates a parallel-serial converter for converting the outputs of the FIFO 60 (namely an image signal sent from the CPU bus 15 and the control information sent through the data line 23) from one-word parallel data to one-bit serial data. Numeral 62 represents a selector which, based upon the one-bit data converted from the control information output by the parallel-serial converter 61, selects the image signal, which has been sent from the CPU bus 15, when this data is a "1", and selects the multivalue image data 33, which is sent from the multivalue image video memory 34, when this data is a "0".

[Description of image synthesizing processing (FIG. 5)]

Figure 5:
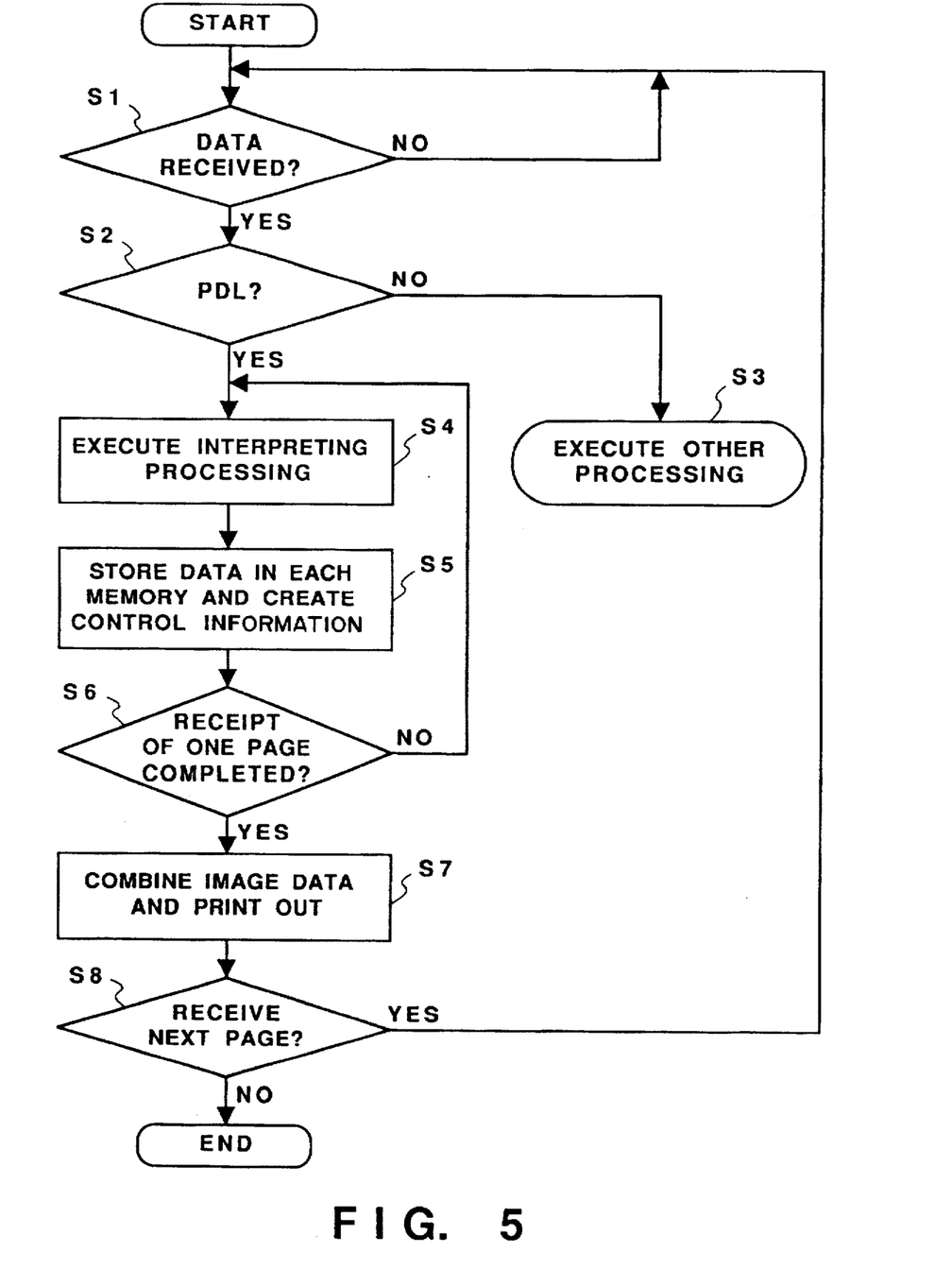
FIG. 5 is a flowchart showing image synthesizing processing in accordance with the first embodiment.

Image synthesizing processing executed by the interpreter 1 having the foregoing construction will now be described with reference to the flowchart of FIG. 5. It will be assumed that color image information described by PDL transmitted by the host 11 is binary value data (i.e., there are no tones)

with regard to each color component, and that multivalue image data has already been written in the multivalue-image video memory 34. Further, it is assumed that the CPU 14 is capable of interpreting, from the PDL, position information which indicates where on the multivalue image data the image data obtained by developing the color image information sent from the host 11 is to be combined with the multivalue image data.

First, at step S1, the CPU 14 is in a state in which it awaits receipt of data from the host 11 via the communication interface 13. When it is determined that the data has been received, the processing proceeds to step S2, at which it is determined whether the received data is image data described in a PDL such as POSTSCRIPT®. If it is determined that the received data is image data described in PDL, the processing proceeds to step S4. If it is determined that the received data is not image data described in PDL, then the processing proceeds to step S3, where processing in conformity with the received data is executed. Even if receipt of image data other than that described in PDL has been confirmed at step S2, storage of data in each of the memories is carried out at step S3.

Next, at step S4, a PDL interpreter program that has been stored in the ROM 16 is started using the RAM 17 as a working area, whereby the items of image data received via the communication interface 13 are interpreted one after another. At this time the aforementioned position information is generated, namely the position information indicating where the image data, which is obtained by interpreting the PDL sent from the host 11 and developing the color image information, is to be combined with the multivalue image data. As will be set forth below, the position information is stored, as control information, in the RAM 36 from the CPU bus 15 via the CPU data bus 54 and RAM data bus 55.

Next, at step S5, the image data that has been put into the form of a raster image is developed in the first through fourth memories 18–21, while use is made of the RAM 17, in accordance with the interpreting processing. In this embodiment, it is assumed that two-valued data of the color components Y (yellow), M (magenta), C (cyan) and BK (black) is developed in the first through fourth memories 18–21, respectively. In other words, "0" or "1" data is set in the first through fourth memories 18–21 with regard to the color components (Y, M, C, BK) of each of the pixels.

The control information is stored in the RAM 36 of the bit-map memory 22 at the same time as this storage of the image data in the first through fourth memories 18–21. It is assumed that the bits of all addresses have been reset to "0" in the initial state of the RAM 36.

First, at the same time that the data of the Y (yellow) component is developed in the first memory 18, the same data is developed in the RAM 36. That is, for a pixel that has been set to "1", with regard to the Y component, "1" is set also as the corresponding address of the RAM 36. Next, when data of the M (magenta) component is developed in the second memory 19, the same data is applied to the A-side of the OR circuit 52 from the CPU data bus 54. At this time, information written in previously with regard to the Y component is read out and applied to the B-side of the OR circuit 52. Here the result of the OR operation is written at the corresponding address of the RAM 36. The same processing is executed when the C (cyan) component is developed in the third memory 20 and when the BK (black) component is developed in the fourth memory 21.

Accordingly, when development of the image data in the first through fourth memories 18–21 has been completed, the storage of the control information in the RAM 36 also will have been completed.

If, with regard to each pixel of the image data, even one color component among the various color components is set to "1" by virtue of the foregoing processing, "1" is set at the corresponding address of the RAM 36. When multivalue image data output by the multivalue-image video memory 34, described below, is combined in accordance with the control information, control is performed in such a manner that multivalue image data is not output to the corresponding bit.

In other words, when the control information that has been written in the bit-map memory 22 is "1", this means that, with regard to the corresponding pixel, the image data that has been developed in the first through fourth memories 18–21 is selected as the data of the synthesized image. On the other hand, when the data bit is "0", this means that, with regard to the corresponding pixel, the multivalue image data is selected as the data of the synthesized image.

Returning to FIG. 5, it is determined at step S6 whether the reception of one page of data has ended. If it is determined that reception of data is still in progress, the processing returns to step S4 and interpreting processing, processing for developing data in the first through fourth memories 18–21 and processing for creating the control information in the bit-map memory 22 continue until the reception of one page of data ends. On the other hand, if it is determined at step S6 that reception of one page of data has ended, the processing proceeds to step S7.

Based upon the control information that has been written in the bit-map memory 22, the multivalue image data read out of the multivalue-image video memory 34 and the binary value image data developed in the first through fourth memories 18–21 are combined and the result is output to the printer 28.

The CPU 14 actuates the printer 28 and receives a synchronizing signal from the printer 28. At this time the image data of each color component is read out of the first memory 18 (Y component), second memory 19 (M component), third memory 20 (C component) and fourth memory 21 (BK component) in regular order for each and every color component. At the same time, the multivalue image data is read out of the multivalue-image video memory 34 in accordance with the synchronizing signal from the printer 28, and the read data is transferred to the video processing circuit 24.

Control information from the bit-map memory 22 repeatedly enters the video processing circuit 24 when every color component is read out, and the video processing circuit 24 combines the multivalue image data with the binary value image data, which enters via the CPU bus 15, based upon the control information.

Finally, at step S8, it is examined whether there is a succeeding page of image data. If it is determined that the data continues from the next page onward, the processing returns to step S1. Processing is terminated when it has been determined that there is no succeeding page of data.

In accordance with the embodiment, as described above, the control information for image synthesis is created, without processing being performed by the CPU of the interpreter, at the same time that the image information transmitted from the host is developed in memory. At the time of image synthesis, multivalue image data and binary value image data sent from the host can be combined using this control information. As a result, (1) the load on the host is alleviated since a multivalue image involved in synthesis is not handled directly by the host; (2) a large buffer memory for producing a synthesized image is not required; and (3) the load on the CPU of the interpreter is alleviated since it is unnecessary for this CPU to directly handle the bit-map memory for storing the image synthesizing information.

<Second Embodiment>

In this embodiment, a case will be described in which an electrophotographic color copier 2 is connected to an interpreter 1' having substantially the same construction as the interpreter 1 used in the first embodiment, an image read in from the color copier 2 is combined with image information sent from the host, and the resulting synthesized image is output.

Figure 6:
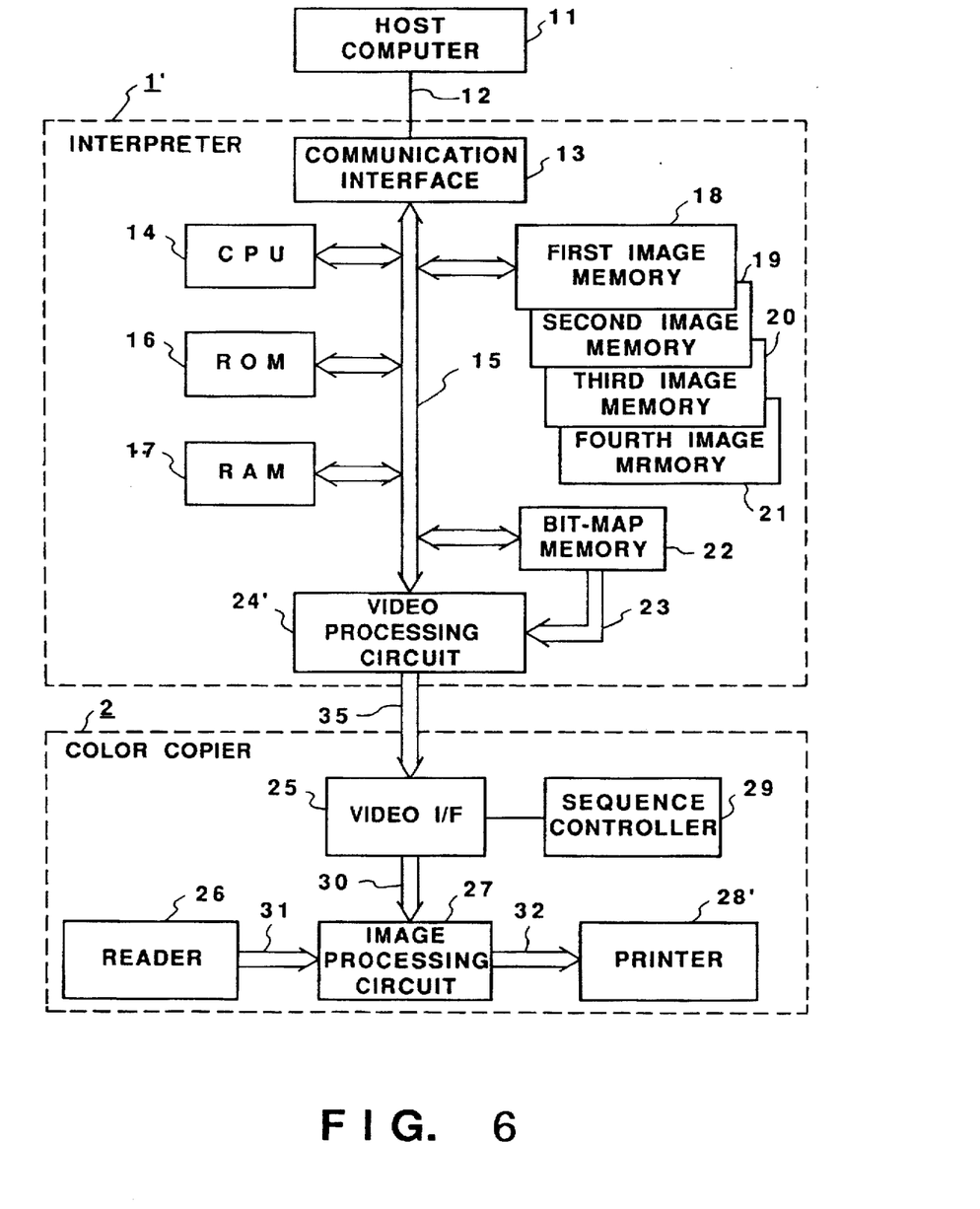
FIG. 6 is a block diagram illustrating the construction of an image processing apparatus in accordance with a second embodiment of the invention.

FIG. 6 is a block diagram illustrating the construction of an image processing apparatus in accordance with this embodiment. Components similar to those in the first embodiment are designated by like reference characters and need not be described again.

As shown in FIG. 6, the interpreter 1' of this embodiment has the same construction as that of the interpreter 1 in the first embodiment except that the interpreter 1' is not provided with the internal multivalue-image video memory 34 but is equipped with a video processing circuit 24' which outputs a video signal of image information produced by the interpreter 1' to the color copier 2. The color copier 2 is connected to the interpreter 1'. The video processing circuit 24 outputs image data, which is the result of developing image information described in PDL sent from the host 11, to the color copier 2.

In this embodiment also, the image data which is the result of developing image information described in PDL sent from the host 11 is assumed to be binary value color image data. Accordingly, the binary value image data and the control information that is obtained from the bit-map memory 22 are output on data line 35.

The color copier 2 comprises a video interface 25 for receiving external video information 35 sent from the video processing circuit 24' and for communicating with the CPU 14 of the interpreter 1'; a reader 26 for reading the image of a color original and outputting multivalue natural-image data 31; an image processing circuit 27; a printing section 28'; and a sequence controller 29 for communicating with the interpreter 1' and setting each unit of the image processing circuit 27. Internal video information which enters via the video interface 25, multivalue image data read by the reader 26, and external video information which includes video data, a synchronizing signal and communication data are transmitted on data lines 30, 31 and 35, respectively.

Figure 7:
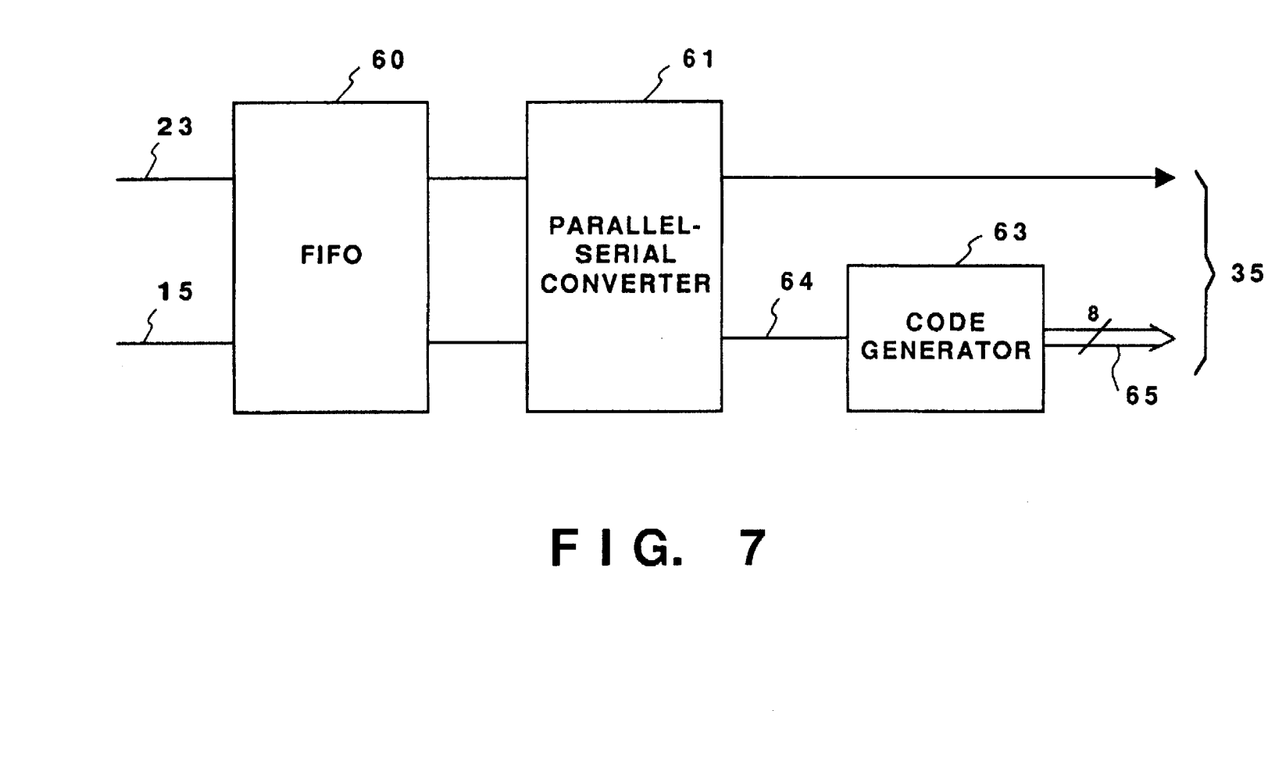
FIG. 7 is a block diagram showing the detailed construction of a video processing circuit in accordance with the second embodiment.

FIG. 7 is a block diagram showing the detailed construction of the video processing circuit 24'. In FIG. 7, numeral 63 denotes a code generating circuit for generating a code composed of eight bits. The code generating circuit 63 outputs two prescribed codes from among codes of 256 tones from "$00_H$" to "$FF_H$" (in hexadecimal representation) in conformity with the values of binary value data which enters through an input data line 64. For example, when the input binary value data is "0", "$00_H$" is output on a data line 65 as density data. When the input binary value data is "1", "$FF_H$" is output on a data line 65 as density data.

It is possible for the output of the code generating circuit 63 to be set to other values, such as "$20_H$" and "$A0_H$". At this time the image processing circuit 27 modulates the density of the output data from the interpreter 1' or decides the output data upon considering the density ratio with respect to the image data 31 read by the reader 26.

In accordance with this embodiment, as described above, an apparatus such as a color copier that is capable of generating an image to be combined is connected to an interpreter, and this image can be combined with image information from a host, thus making it possible to output a synthesized image.

It should be noted that printers such as a color laser printer, a color thermal-transfer printer, a color ink-jet printer and a color dot printer can be used as the printer described above.

Also, the printer can be a so-called bubble-jet type printer causing film boiling by heat energy to eject ink droplets.

<Third embodiment>

Figure 8:
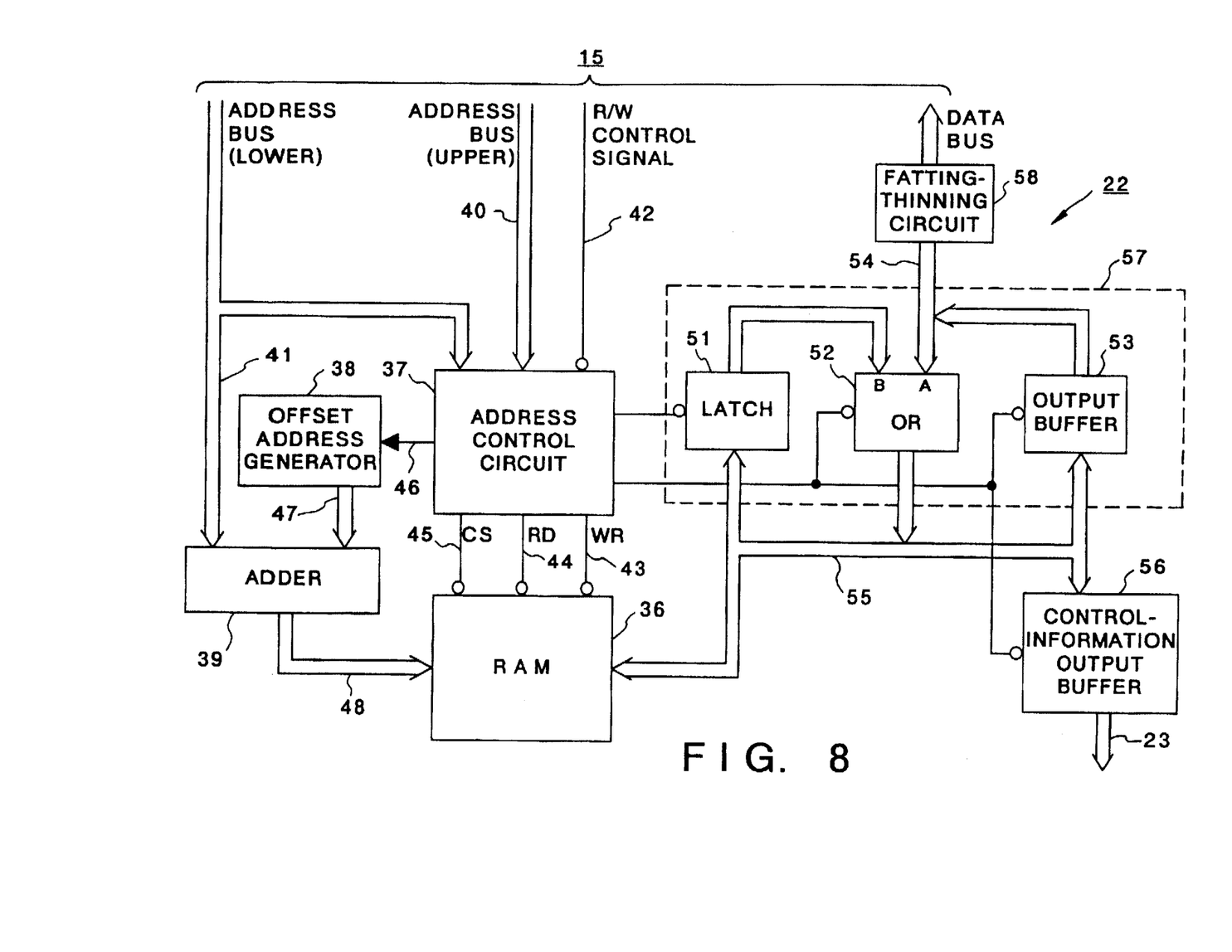
FIG. 8 is a block diagram illustrating the detailed construction of a bit-map memory in accordance with a third embodiment.

In this embodiment, the operation of the bit-map memory in which the fattening-thinning circuit is added on the bit-map memory 22 will be described in reference to FIGS. 8 and 9. The following description will be particularly concentrated on the difference between the operation of the bit-map memory in this embodiment and that of the first embodiment. In FIG. 8, components similar to those in the first embodiment are designated by like reference characters and need not be described again.

In order to highlight an advantage of this embodiment, it is assumed that PDL transmitted by the host 11 represents half-toning image such as shaded circle or dotted triangle.

In case of the bit-map memory 22 according to the first embodiment, since the same image data as that stored in the first through fourth image memories 18–21 is stored in the bit-map memory 22, an image synthesis processing based on the control information stored in the RAM 36 is performed in a manner such that multivalue image data from the multivalue image memory 34 is overlaid on all of pixels where the values of the control information in the corresponding addresses of the RAM 36 are "0". This, however, may result in changing the tonality of the synthesized image.

However, the addition of the fatting-thinning circuit 58 to the bit-map memory as shown in FIG. 8 in this embodiment enables the half-toned area to be filled with the outline color of the image. This prevents the area where the half-toning image produced by PDL is located from being synthesized by multivalue image data from the multivalue image video memory 34.

Figure 9:
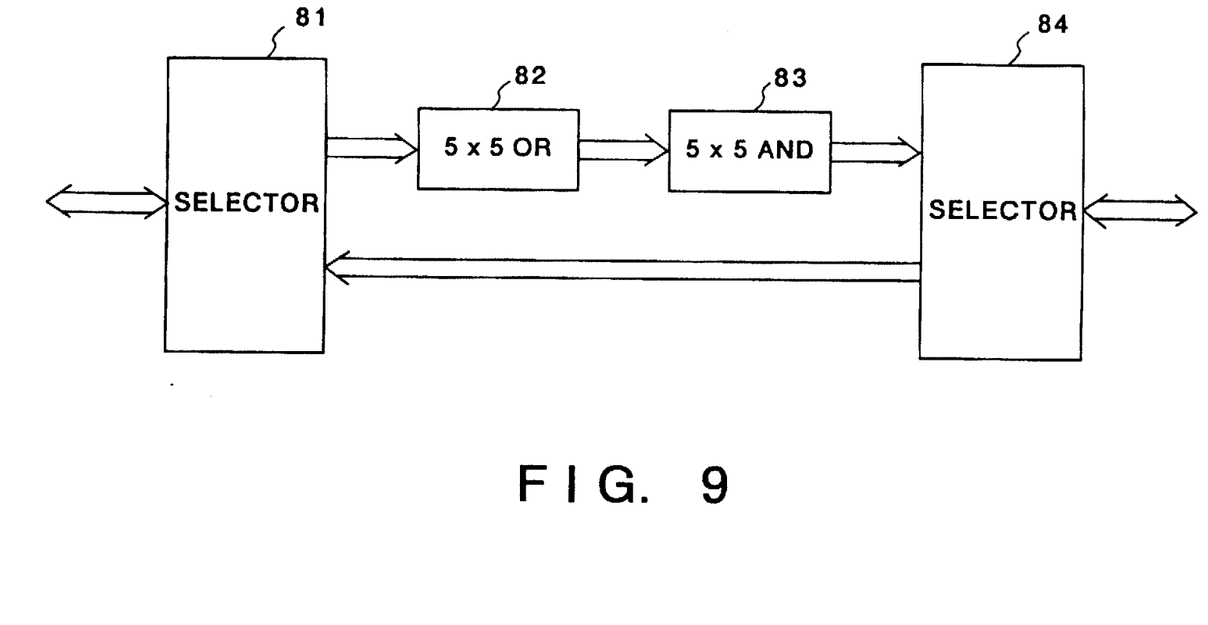
FIG. 9 is a block diagram illustrating the detailed construction of a fattening-thinning circuit.

FIG. 9 shows a block diagram illustrating the construction of the fatting-thinning circuit 58. In this figure, numerals 81 and 84 each denote a selector. Numeral 82 denotes a 5×5 OR circuit which performs the logical OR operation of 25 pixels in a unit of a 5×5 pixels image block. Numeral 83 denotes a 5×5 AND circuit which performs the logical AND operation of 25 pixels in a unit of a 5×5 pixels image block. The 5×5 OR circuit 82 plays a role of expanding dotted pixels (in other words isolated pixels) and removing the isolated pixels as a result of the expansion (hereinafter referred to as a "fattening"). The 5×5 AND circuit 83 plays a role of restoring the pixels to the original size (hereinafter referred to as a "thinning").

In case of transmitting data to the bit-map memory 22, the selectors 81 and 84 select the data channel of the data going through the 5×5 OR circuit 82 and the 5×5 AND circuit 83. In case of transmitting data to the data bus, the selectors 81 and 84 select the data channel in a manner such that the data bypasses the 5×5 OR circuit 82 and the 5×5 AND circuit 83.

In accordance with this embodiment as described above, the whole tonality of the synthesized image can be preferably maintained even though the apparatus synthesizes half-toning image data with multivalue image data.

The fattening-thinning circuit described above can be put on the data line 23 so that it can perform the fattening and thinning processing based on the control information from the RAM 36.

In the three embodiments described above, it is assumed that the image data interpreted from PDL is binary value color data. However, the image information described by PDL may be multivalue color data or black-and-white data.

Furthermore, in the three embodiments described above, it is assumed that the image data combined with the image data interpreted from PDL is video multivalue data or multivalue data read in from a color copier. However, as long as the data is in a format in which it is capable of being processed in an image processing apparatus, the image may be one obtained by any means whatsoever.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for producing a combined image by combining a first image data for each pixel produced based upon image information described in a page-description language and a second image data for each pixel produced by a method different from that used in producing the first image data, such that a first image represented by the first image data and a second image represented by the second image data are overlapped with each other, comprising:

an input step of inputting the page-description language;

an interpretation step of interpreting the image information described in the page-description language and producing the first image data;

a first storing step of storing the first image data for each pixel in a first memory;

a position-information producing step of producing position information, which is indicative of a position at which the first image data exists, for each pixel of the combined image, based on the image information interpreted in said interpretation step;

a second storing step of storing the position information for each pixel in a second memory; and a combining step of producing the combined image by combining the first image data and the second image data by selecting, for each pixel, the first image data or the second image data based upon the position information for each pixel stored in the second memory.

2. The method according to claim 1, wherein said combining step includes selecting and outputting only the first image data if, with regard to each pixel on the combined image, said pixel is a position at which the first image data is outputted.

3. The method according to claim 1, wherein the position information is produced in synchronization with the production of the first image data.

4. An image processing apparatus for producing a combined image by combining a first image data for each pixel produced based upon image information described in a page-description language and a second image data for each pixel produced by a method different from that used in producing the first image data, such that a first image represented by the first image data and a second image represented by the second image data are overlapped with each other, comprising:

receiving means for receiving the page-description language;

interpretation means for interpreting the image information described in the page-description language and producing the first image data;

first memory means for storing the first image data for each pixel;

position-information producing means for producing position information, which is indicative of a position at which the first image data exists, for each pixel of the combined image, based on the image information interpreted by said interpretation means;

second memory means for storing the position information for each pixel; and combining means for producing the combined image by combining the first image data and the second image data by selecting, for each pixel, the first image data or the second image data based upon the position information for each pixel stored in said second memory means.

5. The apparatus according to claim 4, wherein the position information is produced in synchronization with the production of the first image data.

6. The apparatus according to claim 4, wherein said receiving means has communicating means connected to an external device which outputs the page-description language, and receives the page-description language by communicating with said external device.

7. The apparatus according to claim 4, wherein said interpretation means includes:

color-information analyzing means, if the image information contains color image, for analyzing the color information and producing the first image data, which becomes color image data; and color image data output means for outputting data to said first memory means for every color component of said color image data.

8. The apparatus according to claim 7, wherein said color image data is composed of Y (yellow), M (magenta), C (cyan) and BK (black) color-component data, and said color-component data is two-valued data.

9. The apparatus according to claim 4, wherein said first memory means has a plurality of memories which store data for each and every color component of color image data for accommodating a case where the first image data is color image data.

10. The apparatus according to claim 4, wherein said position-information producing means includes:

a bit-map memory which corresponds to the size of the combined image; and bit-map generating means for producing the position information by turning ON a bit at a position of said bit-map memory corresponding to the position at which the first image data is outputted on the combined image.

11. The apparatus according to claim 10, wherein said bit-map generating means includes:

checking means which, in a case where the first image data is indicative of a color image, is for checking to determine whether data is outputted to each pixel of the combined image, for each and every color component of said color image data; and bit-map memory control means for performing control in such a manner that the bit at a corresponding position of said bit-map memory will be ON if, based upon the result of the check performed by said checking means, even one of said color components is outputted, with regard to each pixel.

12. The apparatus according to claim 4, wherein said combining means includes:

third memory means for storing the second image data;

selecting means for selecting the first image data if, with regard to each pixel on the combined image, said pixel is a position at which the first image data is outputted, and selecting the second image data if, with regard to each pixel on the combined image, said pixel is a position at which the first image data is not outputted; and output means for outputting the combined image based upon the results of selection performed by said selecting means.

13. The apparatus according to claim 12, wherein said output means is a color printer which frame-sequentially forms a plurality of color components image.

14. The apparatus according to claim 12, wherein the second image data stored in said third memory means is a multivalue image video signal.

15. The apparatus according to claim 4, wherein said combining means includes:

image data producing means for producing the second image data;

input means for inputting the first image data stored in said first memory means and the position information stored in said second memory means;

selecting means which, based upon the position information, is for selecting the first image data if, with regard to each pixel on the combined image, said pixel is a position at which the first image data is outputted, and selecting the second image data if, with regard to each pixel on the combined image, said pixel is a position at which the first image data is not outputted; and output means for outputting the combined image based upon the results of selection performed by said selecting means.

16. The apparatus according to claim 15, wherein said input means has converting means for converting the first image data into data having a prescribed tone.

17. The apparatus according to claim 15, wherein said image data producing means has a reader for reading in a color-image original, the second image data, which is multivalue image data, being produced from said color-image original read in through said reader.

18. The apparatus according to claim 15, wherein said output means is a color printer which frame-sequentially forms a plurality of color components image.

* * * * *

UNITED STATES PATENT AND TRADEMARK OFFICE
CERTIFICATE OF CORRECTION

PATENT NO. : 5,737,620

DATED : April 7, 1998

INVENTOR(S) : YUICHI SATO

It is certified that error appears in the above-identified patent and that said Letters Patent is hereby corrected as shown below:

IN THE DRAWINGS

Sheet 6, FIG. 6, "MRMORY" should read --MEMORY--; and
Sheet 8, FIG. 8, "FATTING-" should read --FATTENING- --.

COLUMN 1

Line 14, "therefore." should read --therefor.--.

COLUMN 2

Line 3, "complicated" should read --complicated,--.

COLUMN 3

Line 57, "an" should read --and--.

COLUMN 5

Line 2, "memories 18-21" should read --image memories 18-21--.

UNITED STATES PATENT AND TRADEMARK OFFICE
CERTIFICATE OF CORRECTION

PATENT NO. : 5,737,620

DATED : April 7, 1998

INVENTOR(S) : YUICHI SATO

It is certified that error appears in the above-identified patent and that said Letters Patent is hereby corrected as shown below:

COLUMN 10

Line 30, "fatting-thinning" should read --fattening-thinning--; and

Line 38, "fatting-thinning" should read --fattening-thinning--.

Signed and Sealed this

Nineteenth Day of January, 1999

Attest:

Attesting Officer

*Acting Commissioner of Patents and Trademarks*